US008564646B2

(12) United States Patent
Nakahata et al.

(10) Patent No.: US 8,564,646 B2
(45) Date of Patent: Oct. 22, 2013

(54) IMAGE DISPLAY APPARATUS, IMAGE DISPLAY OBSERVATION SYSTEM, AND IMAGE DISPLAY METHOD (75) Inventors: Yuji Nakahata, Kanagawa (JP); Makoto Nakagawa, Tokyo (JP)

(73) Assignee: Sony Corporation (JP)

( * ) Notice: Subject to any disclaimer, the term of this patent is extended or adjusted under 35 U.S.C. 154(b) by 437 days.

(21) Appl. No.: 12/660,817

(22) Filed: Mar. 4, 2010

(65) Prior Publication Data
US 2010/0231698 A1 Sep. 16, 2010

(30) Foreign Application Priority Data

Mar. 13, 2009 (JP) ................................ P2009-061521

(51) Int. Cl.
*H04N 13/04* (2006.01)
(52) U.S. Cl.
USPC ................... 348/51; 348/47; 348/56; 348/60; 345/7; 345/32; 396/429
(58) Field of Classification Search
USPC ................ 348/42–60; 345/1.1–9, 32; 349/15; 353/7
See application file for complete search history.

(56) References Cited

U.S. PATENT DOCUMENTS

| 5,717,412 | A | 2/1998 | Edwards |
| 6,314,248 | B1 * | 11/2001 | Ohmura et al. ............... 396/429 |
| 7,385,625 | B2 * | 6/2008 | Ohmura et al. ................ 348/51 |
| 7,430,018 | B1 | 9/2008 | Patel |
| 2004/0130645 | A1 * | 7/2004 | Ohmura et al. .......... 348/333.08 |
| 2005/0264717 | A1 * | 12/2005 | Chien et al. ..................... 349/61 |
| 2006/0164330 | A1 * | 7/2006 | Bright et al. ..................... 345/7 |
| 2006/0181895 | A1 | 8/2006 | Hu et al. |
| 2008/0042924 | A1 | 2/2008 | Lee et al. |
| 2008/0084513 | A1 * | 4/2008 | Brott et al. ...................... 349/15 |
| 2009/0115688 | A1 * | 5/2009 | Adachi et al. .................. 345/32 |
| 2010/0289883 | A1 * | 11/2010 | Goris et al. ..................... 348/56 |

FOREIGN PATENT DOCUMENTS

| EP | 2015589 A1 | 1/2009 |
| JP | 09-138384 A | 5/1997 |
| JP | 2000-036969 A | 2/2000 |

(Continued)

OTHER PUBLICATIONS

Chun-Ho Chen et al: "3-D Mobile Display Based on Moira-Free Dual Directional Backlight and Driving Scheme for Image Crosstalk Reduction", Journal of Display Technology, IEEE Service Center, New York, NY, US. vol. 4, No. 1, Mar. 1, 2008, pp. 92-96, XP 011334366.

(Continued)

*Primary Examiner* — Sath V Perungavoor
*Assistant Examiner* — Dakshesh Parikh
(74) *Attorney, Agent, or Firm* — Lerner, David, Littenberg, Krumholz & Mentlik, LLP (57) ABSTRACT There is provided an image display apparatus including a signal control unit for receiving an input of an image signal, and converting to a signal for alternately displaying a right eye image and a left eye image, a display panel, input with the signal converted by the signal control unit, for alternately displaying the right eye image and the left eye image, a surface light source for radiating the display panel from a rear surface, and a surface light source control unit for causing the surface light source to emit light according to switching of the right eye image and the left eye image.

9 Claims, 6 Drawing Sheets

(56) References Cited

FOREIGN PATENT DOCUMENTS

| | | |
|---|---|---|
| JP | 2003-045343 A | 2/2003 |
| JP | 2005077437 A | 3/2005 |
| JP | 2006157775 A | 6/2006 |
| JP | 2006235461 A | 9/2006 |
| JP | 2007-110683 A | 4/2007 |
| JP | 2007148444 A | 6/2007 |
| JP | 2008096902 A | 4/2008 |
| JP | 2008287180 A | 11/2008 |
| JP | 2008306335 A | 12/2008 |
| JP | 2009-025436 A | 2/2009 |
| JP | 2009031523 A | 2/2009 |
| JP | 2009061521 A | 3/2009 |
| JP | 2010049049 A | 3/2010 |
| WO | 2007095476 A2 | 8/2007 |
| WO | 2007126904 A2 | 11/2007 |

OTHER PUBLICATIONS

European Search Report EP 10155622, dated Sep. 30, 2011.
Partial European Search Report EP 10155622, dated Dec. 22, 2010.
Office Action from Japanese Application No. 2009-061521, dated Nov. 30, 2010.
Office Action from Japanese Application No. 2011-145579, dated Mar. 19, 2013.
Office Action from Japanese Application No. 2011-018693, dated Mar. 26, 2013.
Office Action from Japanese Application No. 2011-145579, dated Aug. 20, 2013.
Office Action from Japanese Application No. 2011-018693, dated Aug. 20, 2013.

* cited by examiner

FIG.3A
FIG.3B

IMAGE DISPLAY APPARATUS, IMAGE DISPLAY OBSERVATION SYSTEM, AND IMAGE DISPLAY METHOD

CROSS-REFERENCE TO RELATED APPLICATION

The present application claims priority from Japanese Patent Application No. JP 2009-061521 filed in the Japanese Patent Office on Mar. 13, 2009, the entire content of which is incorporated herein by reference.

BACKGROUND OF THE INVENTION

1. Field of the Invention

The present invention relates to an image display apparatus, an image display observation system, and an image display method.

2. Description of the Related Art

In the related art, as described in Japanese Patent Application Laid-Open Nos. 9-138384, 2000-36969, and 2003-45343, a method of alternately providing a left eye image and a right eye image having parallax to a display at a predetermined cycle, and observing the image with eyeglasses equipped with liquid crystal shutters operated in synchronization at a predetermined cycle is known.

SUMMARY OF THE INVENTION

However, in the three-dimensional image display observation system described above, with the shutters such as the liquid crystal shutters, it is difficult to ensure high contrast of the opened state and the closed state. Thus, the leak light may enter the eyes of the user even when the shutters are in the closed state. Therefore, there arises an issue of crosstalk that the right eye image and the left eye image are visually recognized in a mixed manner by the user.

In light of the foregoing, it is desirable to provide a novel and improved image display apparatus, an image display observation system, and an image display method which make it possible to reliably suppress the occurrence of crosstalk that the right eye image and the left eye image mix.

According to an embodiment of the present invention, there is provided an image display apparatus including a signal control unit for receiving an input of an image signal, and converting to a signal for alternately displaying a right eye image and a left eye image, a display panel, input with the signal converted by the signal control unit, for alternately displaying the right eye image and the left eye image, a surface light source for radiating the display panel from a rear surface, and a surface light source control unit for causing the surface light source to emit light according to switching of the right eye image and the left eye image.

The image display apparatus may include a shutter control unit for generating a timing signal indicating a switching timing of the right eye image and the left eye image in order to notify viewing eyeglasses including a right eye shutter and a left eye shutter of the switching timing of the right eye image and the left eye image. A period during which the shutter is open based on the timing signal may be less than 50% of a period during which the right eye image and the left eye image are displayed.

The surface light source control unit may cause the surface light source to emit light in accordance with the period during which the shutter is open.

The surface light source control unit may cause the surface light source to scan light-emit from one end toward the other end of the display panel.

The signal control unit may convert to a signal for displaying each of a right eye image signal and a left eye image signal at least two times continuously.

The surface light source control unit may cause the surface light source to emit light with a higher luminance than that in a normal two-dimensional image display when the surface light source control unit causes the surface light source to emit light according to the switching of the right eye image and the left eye image.

The image display apparatus may include a shutter control unit for generating a timing signal indicating a switching timing of the right eye image and the left eye image with respect to viewing eyeglasses including a right eye shutter and a left eye shutter.

The surface light source control unit may cause the surface light source to emit light for the same period as an open period of the shutter or for a period which is longer than the open period of the shutter according to the switching of the right eye image and the left eye image.

The surface light source may be constituted by an LED.

According to another embodiment of the present invention, there is provided an image display observation system including an image display apparatus including a signal control unit for receiving an input of an image signal, and converting to a signal for alternately displaying a right eye image and a left eye image, a display panel, input with the signal converted by the signal control unit, for alternately displaying the right eye image and the left eye image, which were input after converted by the signal control unit, a surface light source for radiating the display panel from a rear surface, a surface light source control unit for causing the surface light source to emit light according to switching of the right eye image and the left eye image, and a shutter control unit for generating a timing signal indicating a switching timing of the right eye image and the left eye image, and three-dimensional image observation eyeglasses, including a right eye shutter and a left eye shutter, for alternately opening the right eye and the left eye shutters based on the timing signal.

According to another embodiment of the present invention, there is provided an image display method including the steps of receiving an input of an image signal, and converting to a signal for alternately displaying a right eye image and a left eye image, alternately displaying the right eye image and the left eye image based on the converted signal, and causing a surface light source of a display panel for displaying the right eye image and the left eye image to emit light according to switching of the right eye image and the left eye image.

According to the embodiments of the present invention described above, the occurrence of crosstalk that the right eye image and the left eye image mix can be reliably suppressed.

DETAILED DESCRIPTION OF THE EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.

(1) Example of system configuration
(2) Example of configuration of image display apparatus
(3) Regarding timing of left and right video displays and opening and closing of shutters
(4) Example of writing two times according to present embodiment
(5) Regarding synchronization between backlight and opening and closing of shutters
(6) Regarding scan lighting of backlight

[(1) Example of System Configuration]

Figure 1:
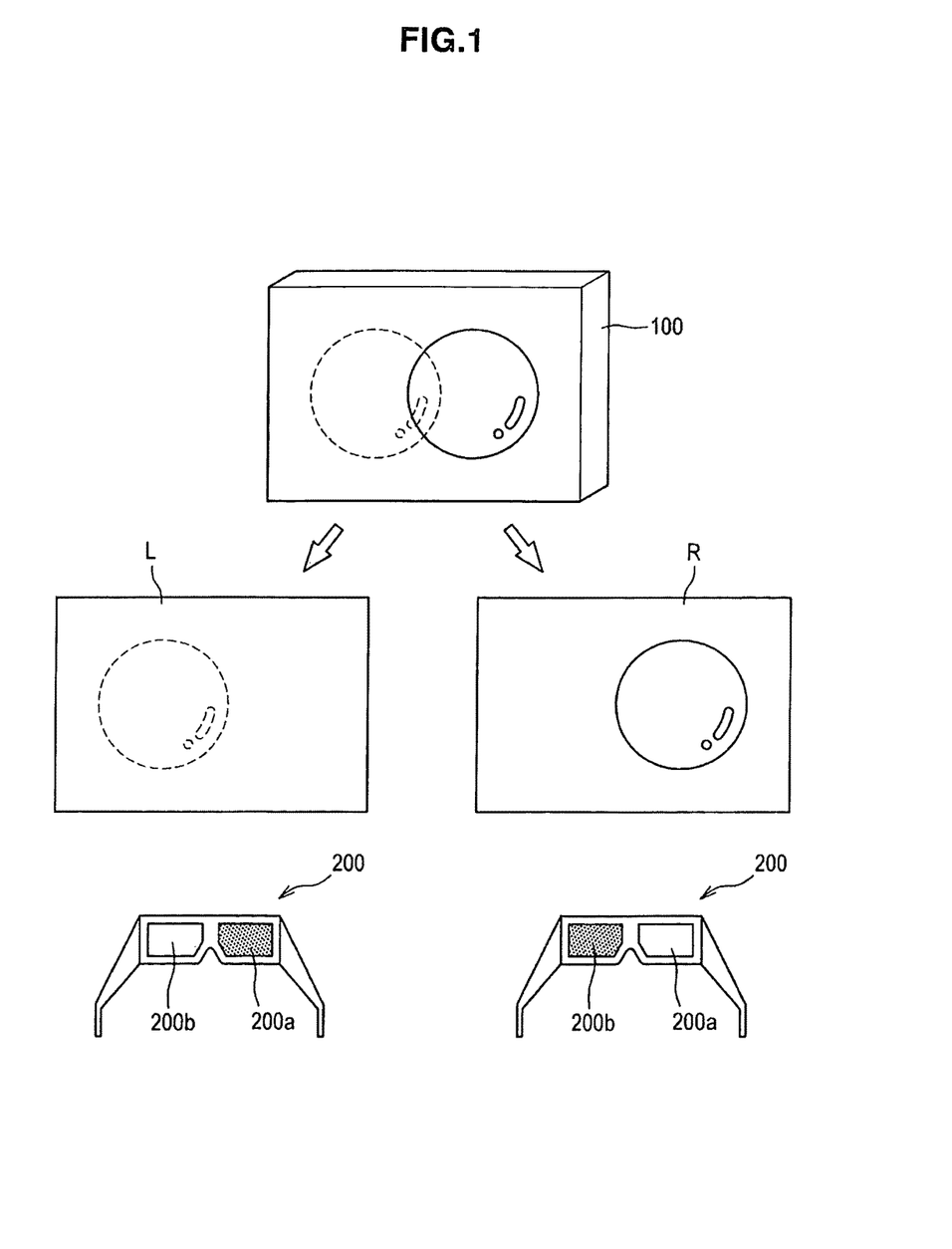
FIG. 1 is a schematic view showing a configuration of a three-dimensional image display observation system according to an embodiment of the present invention.

FIG. 1 is a schematic view showing a configuration of a three-dimensional image display observation system according to an embodiment of the present invention. As shown in FIG. 1, the system according to the present embodiment includes an image display apparatus 100 constituted by a LCD, and displayed image viewing eyeglasses 200.

The image display apparatus 100 alternately displays a right eye image R and a left eye image L for every field. The displayed image viewing eyeglasses 200 include a pair of liquid crystal shutters 200a, 200b at the parts corresponding to the lens. The liquid crystal shutters 200a, 200b alternately perform the opening and closing operation in synchronization with the image switching for every field of the image display apparatus 100. In other words, the liquid crystal shutter 200b for the left eye is in the closed state and the liquid crystal shutter 200a for the right eye is in the opened state in the field in which the right eye image R is displayed on the image display apparatus 100. The opposite operation is performed in the field in which the left eye image L is displayed.

Through such operation, only the right eye image R enters the right eye and only the left eye image L enters the left eye of the user viewing the image display apparatus 100 while wearing the viewing eyeglasses 200. The right eye and left eye images are synthesized behind the eyes of the viewer, and an image displayed on the image display apparatus 100 is three-dimensionally recognized. The image display apparatus 100 can also display a normal two-dimensional image, in which case the switching of the right eye image R and the left eye image L is not performed.

[(2) Example of Configuration of Image Display Apparatus]

Figure 2:
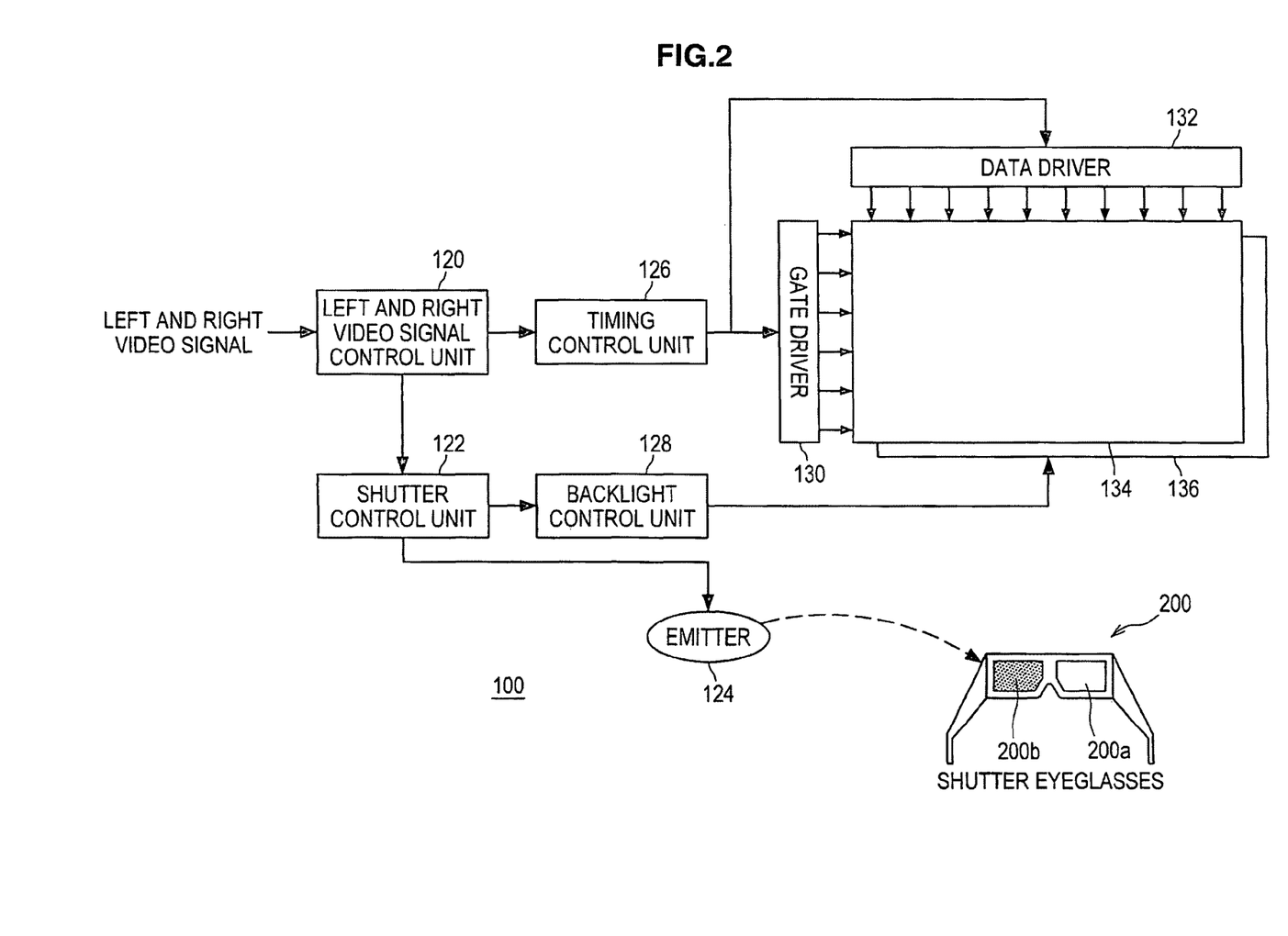
FIG. 2 is a block diagram showing the configuration of an image display apparatus.

The configuration of the image display apparatus 100 will now be described. FIG. 2 is a block diagram showing the configuration of the image display apparatus 100. As shown in FIG. 2, the image display apparatus 100 includes a left and right video signal control unit 120, a shutter control unit 122, an emitter 124, a timing control unit 126, a back light control unit 128, a gate driver 130, a data driver 132, a liquid crystal display panel 134. A backlight (surface light source) 136 is arranged behind the liquid crystal display panel 134.

The liquid crystal display panel 134 is constituted by a liquid crystal layer, transparent electrodes facing each other with the liquid crystal layer in between, a color filter, and the like. The decay characteristic of the phosphor constituting the backlight is set to 4 ms or smaller. The backlight 136 is constituted by an LED and the like having satisfactory decay characteristic.

The left and right video signals for displaying the right eye image R and the left eye image L are input to the left and right video signal control unit 120. The left and right video signal control unit 120 alternately outputs the left and right video signals to alternately display the right eye image R and the left eye image L on the liquid crystal display panel 134. The left and right video signal control unit 120 also performs conversion such that the same signal continues twice for each of the right eye video signal and the left eye video signal to perform writing two times, to be hereinafter described, based on the input left and right video signals.

The right eye video signal and the left eye video signal converted by the left and right video signal control unit 120 are input to the timing control unit 126. The timing control unit 126 converts the right eye video signal and the left eye video signal, which are input, to signals to be input to the liquid crystal display panel 134, and generates a pulse signal used for the operation of the gate driver 130 and the data driver 132.

The signals converted by the timing control unit 126 are input to the gate driver 130 and the data driver 132, respectively. The gate driver 128 and the data driver 130 receive the pulse signal generated by the timing control unit 126, and cause each pixel of the liquid crystal display panel 134 to emit light based on the input signals. The video is thereby displayed on the liquid crystal display panel 134.

The left and right video signal control unit 120 sends a timing signal indicating the timing of switching of the right eye video signal and the left eye video signal converted such that same signal continues twice. The shutter control unit 122 sends a drive signal for causing light emitting the emitter 126 to emit light to the emitter 126 based on the timing signal sent from the left and right video signal control unit 120. The emitter 126 transmits an optical signal indicating the timing of switching of the left and right video signals to the viewing eyeglasses 200.

The displayed image viewing eyeglass 200 includes a sensor for receiving the optical signal, of which detailed explanation will be omitted. The viewing eyeglasses 200 that received the optical signal alternately perform the opening and closing operation of the liquid crystal shutters 200a, 200b in synchronization with the timing of switching of the right eye video signal and the left eye video signal of the image display apparatus 100.

The timing signal output by the shutter control unit 122 is input to a backlight control unit 128. The backlight control unit 128 outputs a control signal for lighting the backlight 136 based on the input timing signal. The backlight 136 performs lighting based on the control signal input from the backlight control unit 128.

[(3) Regarding Timing of Left and Right Video Displays and Opening and Closing of Shutters]

Figure 3A:
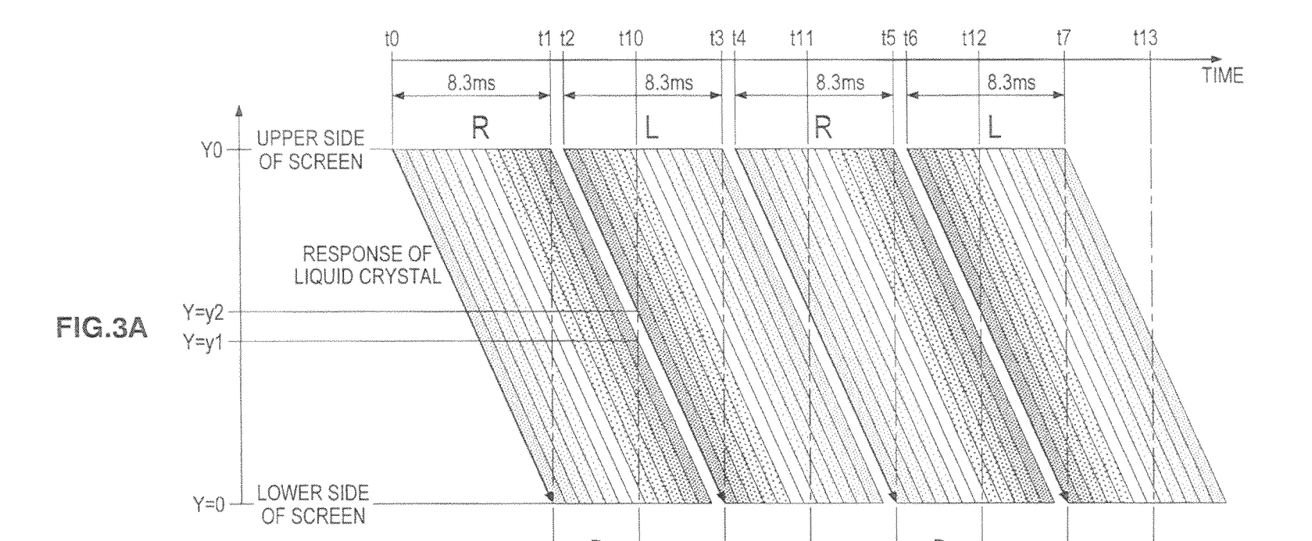
FIGS. 3A and 3B are timing charts showing the timing of the left and right video displays and the opening and closing of liquid crystal shutters.
Figure 3B:
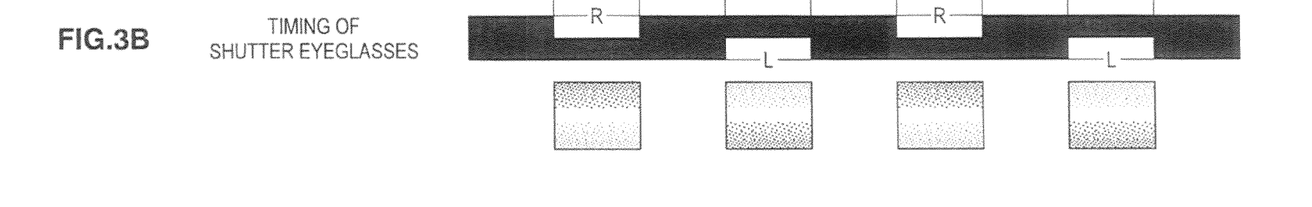

FIGS. 3A and 3B are timing charts showing the timing of the left and right video displays and the opening and closing of the liquid crystal shutters 200a, 200b. As described above, the right eye image R and the left eye image L are alternately displayed in the image display apparatus 100, but flicker (flickering of screen) occurs if the drive frequency, at which one frame of the right eye image R or the left eye image L is displayed, is lower than or equal to 60 [Hz]. Thus, a case in which one frame of the right eye image R or the left eye image L is displayed at 120 [Hz] is shown in FIGS. 3A and 3B. In other words, in FIGS. 3A and 3B, each of the right eye image R and the left eye image L is displayed at the drive frequency of 120 [Hz], and the time the right eye image R or the left eye image L is displayed is 1/120 [Hz]=8.3 [ms].

In the liquid crystal display panel 132, the display is normally performed line sequentially from one end to the other end of the screen. In FIG. 3A, a state is shown in which the display is performed line sequentially from the upper side (Y=Y0) to the lower side (Y=0) of the liquid crystal display panel, and the luminance is changed with time at each position in the vertical direction from the upper side to the lower side.

As shown in FIG. 3A, the right eye image R is displayed from time t0 to t1 at the upper side (Y=Y0) of the screen, and the left eye image L is displayed from time t2 to t3 after a predetermined blank period. Thereafter, the right eye image R is displayed from time t4 to t5, and the left eye image L is displayed from time t6 to t7 with the predetermined blank period in between.

Focusing on the upper side (Y=Y0) of the screen from time t0 to t1 during which the right eye image R is displayed, when the display of the right eye image R starts at time to, the luminance of the upper side of the screen rises with elapse of time and the desired luminance is achieved at time t1. The display of the right eye image R at the upper side of the screen is then finished. In the present specification, the display on the liquid crystal display panel 134 is sometimes referred to as writing of display data to the liquid crystal panel 134. As described above, the display is performed line sequentially from the upper side to the lower side of the screen on the liquid crystal display panel 134, Therefore, the time at which the display of the right eye image R starts becomes later than t0, and the time at which the display of the right eye image R is finished becomes later than t1 towards the lower side.

Similarly, focusing on the upper side (Y=Y0) of the screen from time t2 to t3 during which the left eye image L is displayed, when the display of the left eye image L starts at time t2, the luminance of the upper side of the screen rises with elapse of time and the desired luminance is achieved at time t3. Accordingly, the display of the left eye image L at the upper side of the screen is finished. For the left eye image L as well, the time at which the display of the left eye image L starts becomes later than t2, and the time at which the display of the left eye image L is finished becomes later than t3 towards the lower side.

As shown in FIG. 3A, the response speed of the liquid crystal is relatively slow when the display is performed line sequentially. Therefore, for the writing of the right eye image R, the writing eventually starts at the lower side of the screen at the time t1 at which the desired luminance is achieved at the upper side of the screen. For the writing of the left eye image L as well, the writing eventually starts at the lower side of the screen at time t3 at which the desired luminance is achieved at the upper side of the screen.

FIG. 3B shows the opening and closing timing of the liquid crystal shutters 200a, 200b. As shown in FIG. 3B, the liquid crystal shutter R for the right eye (liquid crystal shutter 200a) is opened between time t1 and t10, and between time t5 and t12. The liquid crystal shutter L for the left eye (liquid crystal shutter 200b) is opened between time t3 and t11, and between time t7 and t13.

When the liquid crystal shutter 200a is opened between time t1 and t10, the right eye image R is displayed at the timing the liquid crystal shutter 200a is opened in the region from the lower side (Y=0) of the screen to Y=y1 shown in FIG. 3A, so that the right eye image R is visually recognized by the right eye of the user. However, in the region of Y>y2, the display of the right eye image R is finished and the next left eye image L is displayed while the shutter 200a is opened. At the upper side (Y=Y0) of the screen, the left eye image L of the next frame is displayed between time t1 and t10. Therefore, the user visually recognizes the video in the transient state of transitioning from the right eye image R to the left eye image L in the neighborhood of the middle between the lower side and the upper side of the screen of Y>y2, and visually recognizes the left eye image L of the next frame in the neighborhood of the upper side (Y=Y0) of the screen. Therefore, there arises an issue of crosstalk that the right eye image R and the left eye image L are visually recognized in a mixed manner by the user.

Although the right eye image R is displayed between time t1 and t10 during which the liquid crystal shutter 200a is opened in the neighborhood of the lower side (Y=0) of the screen, the liquid crystal may not sufficiently respond as the liquid crystal shutter 200a is opened immediately after the display starts at time t1. Thus, the video visually recognized by the user, in the neighborhood of the lower side (Y=0) of the screen does not have a sufficiently high luminance, and the user may not visually recognize the video with the desired luminance.

[(4) Example of Writing Two Times According to Present Embodiment]

To resolve the occurrence of cross talk caused by the lack of response speed of the liquid crystal, the lack of luminance and the like, the present embodiment adopts a method of increasing the drive frequency of the liquid crystal panel, and double displaying (writing) one frame of left and right images on the liquid crystal display panel 134.

Figure 4A:
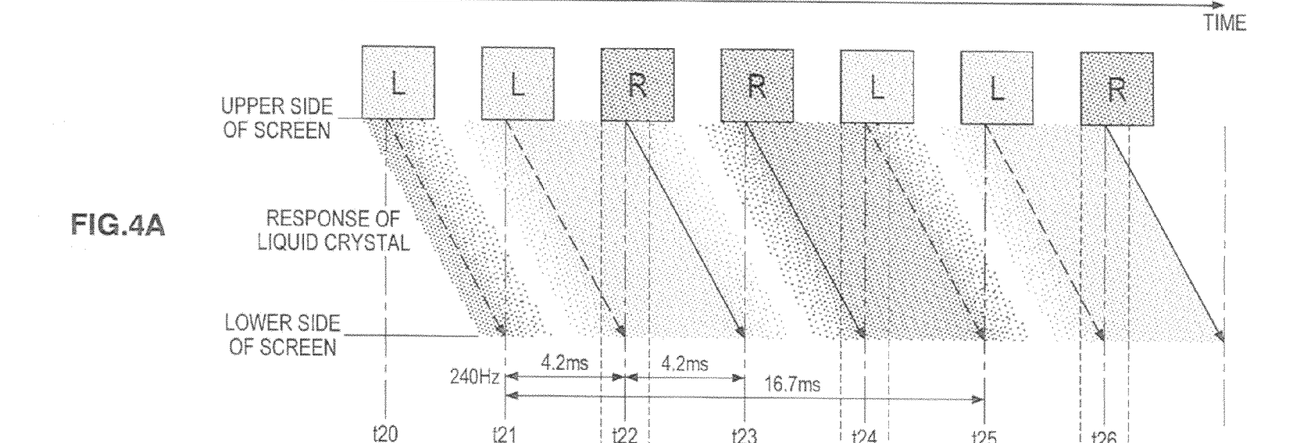
FIGS. 4A to 4C are timing charts showing the principle of writing two times and the opening and closing of the liquid crystal shutters according to the present embodiment.
Figure 4B:
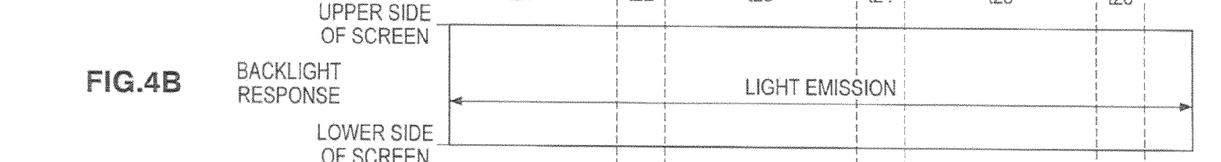
Figure 4C:
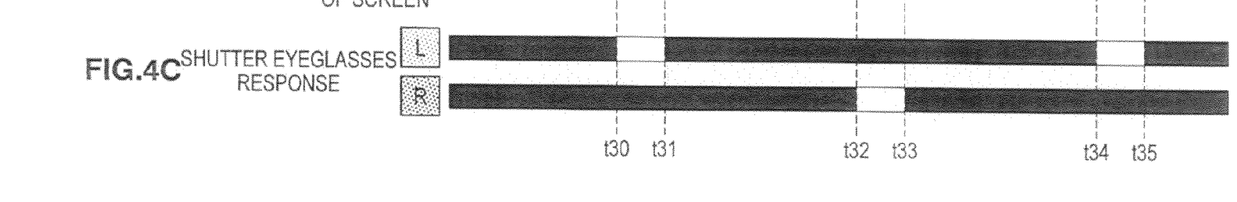

FIGS. 4A to 4C are timing charts showing the principle of writing two times and the opening and closing of the liquid crystal shutters 200a, 200b according to the present embodiment in a case in which the right eye image R and the left eye image L are respectively displayed at the drive frequency of 240 [Hz]. In FIGS. 4A to 4C, the time during which the right eye image R or the left eye image L is displayed by one writing is 1/240 [Hz]=4.2 [ms].

Similar to FIG. 3A, FIG. 4A shows a state in which the luminance is changed with time at each position in the vertical direction from the lower side (Y=0) to the upper side (Y=Y0) of the liquid crystal display panel 134. FIG. 4B shows a state in which the backlight 136 of the liquid crystal display panel 134 is emitting light. In the example shown in FIG. 4B, the backlight 136 is lighted on a constant basis. FIG. 4C shows the opening and closing timing of the liquid crystal shutters 200a, 200b, similar to FIG. 3B.

As shown in FIG. 4A, the left eye image L is written during the 4.2 [ms] from time t20 to t21 at the upper side (Y=Y0) of the screen, and the left eye image L is continuously written during the 4.2 [ms] from time t21 to t22. The left eye image L written between time t20 and t21 and the left eye image written between time t21 and t22 are basically the same image, but may differ due to adjustments such as overdrive processing and the like. A predetermined blank period may be provided between the left eye image L written for the first time and the left eye image L written for the second time.

The right eye image R is written after the left eye image L is written twice. For the right eye image R as well, the right eye image R is written during the 4.2 [ms] from time t22 to t23, and then the right eye image R is continuously written during the 4.2 [ms] from time t23 to t24 at the upper side (Y=Y0) of the screen. The right eye image R written between time t22 and t23 and the right eye image written between time t23 and t24 are basically the same image, but may differ due to adjustments such as overdrive processing and the like. A predetermined blank period may be provided between the right eye image R written for the first time and the right eye image R written for the second time, or between the left eye image L and the right eye image R.

Generally, the response time of the liquid crystal display device is relatively slow, and thus each pixel does not achieve the desired luminance if the writing time is a short time. Thus, if the right eye image R and the left eye image L are alternately written with the drive frequency increased, one writing time (=4.2 ms) becomes short and the desired luminance is reached only after the first writing, and hence the timing at which both the upper side and the lower side of the screen reach the desired luminance does not exist.

In the present embodiment, the right eye image R and the left eye image L are respectively written twice, and thus the desired luminance can be held at the time of the second writing, and a state in which the desired luminance is reached at both the upper side and the lower side of the screen can be realized.

In FIG. 4A, at the time point of time t22, the luminance of the left eye image L reaches the desired level in the entire region from the upper side of the screen to the lower side of the screen. Therefore, as shown in FIG. 4C, only the left eye image L is visually recognized by the left eye of the user and the occurrence of crosstalk can be reliably suppressed by opening the liquid crystal shutter 200b only for a predetermined period (e.g., 2.1 ms) having the time t22 as the center. The crosstalk and the luminance are in a trade-off relationship, so that the shutter-open period can be appropriately set depending on which to prioritize.

Similarly, for the right eye image R, at the time point of time t24 shown in FIG. 4A, the luminance of the right eye image R reaches the desired level in the entire region from the upper side of the screen to the lower side of the screen. Therefore, as shown in FIG. 4C, only the right eye image R is visually recognized by the right eye of the user and the occurrence of crosstalk can be reliably suppressed by opening the liquid crystal shutter 200a only for a predetermined period (e.g., 2.1 ms) having the time t24 as the center.

As described above, the desired luminance is not reached at the lower part of the screen at the end of writing in the first writing if the drive frequency of the liquid crystal is increased, and thus the liquid crystal shutters 200a, 200b are closed in at least one partial interval at the time of first writing, during which the liquid crystal display panel 134 is in the state of the transient response. More specifically, the liquid crystal shutters 200a, 200b are closed in the interval of 4.2 ms corresponding to the interval longer than at least 50% of about 8.4 ms during which the right eye image R or the left eye image L is displayed. Thereby, it is possible to avoid that the video in the state of the transient response due to the first writing is not visually recognized by the user.

In the present embodiment, as shown in FIG. 4C, the liquid crystal shutter R for the right eye (liquid crystal shutter 200a) is opened only for a predetermined time (2.1 ms) having the time t24 as the center. The liquid crystal shutter L for the left eye (liquid crystal shutter 200b) is opened only for a predetermined time (2.1 ms) having the time t22, t26 as the center.

At the time point of time t24, the second writing of the right eye image R starts at the lower side of the screen, and the second writing of the right eye image R ends at the upper side of the screen. Therefore, the right eye image R by the first writing is not visually recognized by the right eye of the user by opening the liquid crystal shutter 200a at the time point of time t24, and the right eye image R by the second writing is visually recognized by the right eye of the user in the entire region from the lower side to the upper side of the screen.

Similarly, at the time points of t22, t26, the second writing of the left eye image L starts at the lower side of the screen, and the second writing of the left eye image L ends at the upper side of the screen. Therefore, the left eye image L by the first writing is not visually recognized by the left eye of the user by opening the liquid crystal shutter 200b at the time point of time t22 or time t26. The left eye image L by the second writing is thus visually recognized by the left eye of the user in the entire region from the lower side to the upper side of the screen.

In this manner, the video in which the desired luminance is reached in the entire screen can be visually recognized by the user by reaching the desired luminance in the first writing and holding such luminance in the second writing. Therefore, at the time points of t22, t24, and t26 shown in FIG. 4C, the occurrence of the crosstalk can be reliably suppressed by opening the liquid crystal shutters 200a, 200b only for a predetermined minimum time (e.g., 2.1 ms).

[(5) Regarding Synchronization Between Backlight and Opening and Closing of Shutters]

Figures 5A, 5B, 5C:
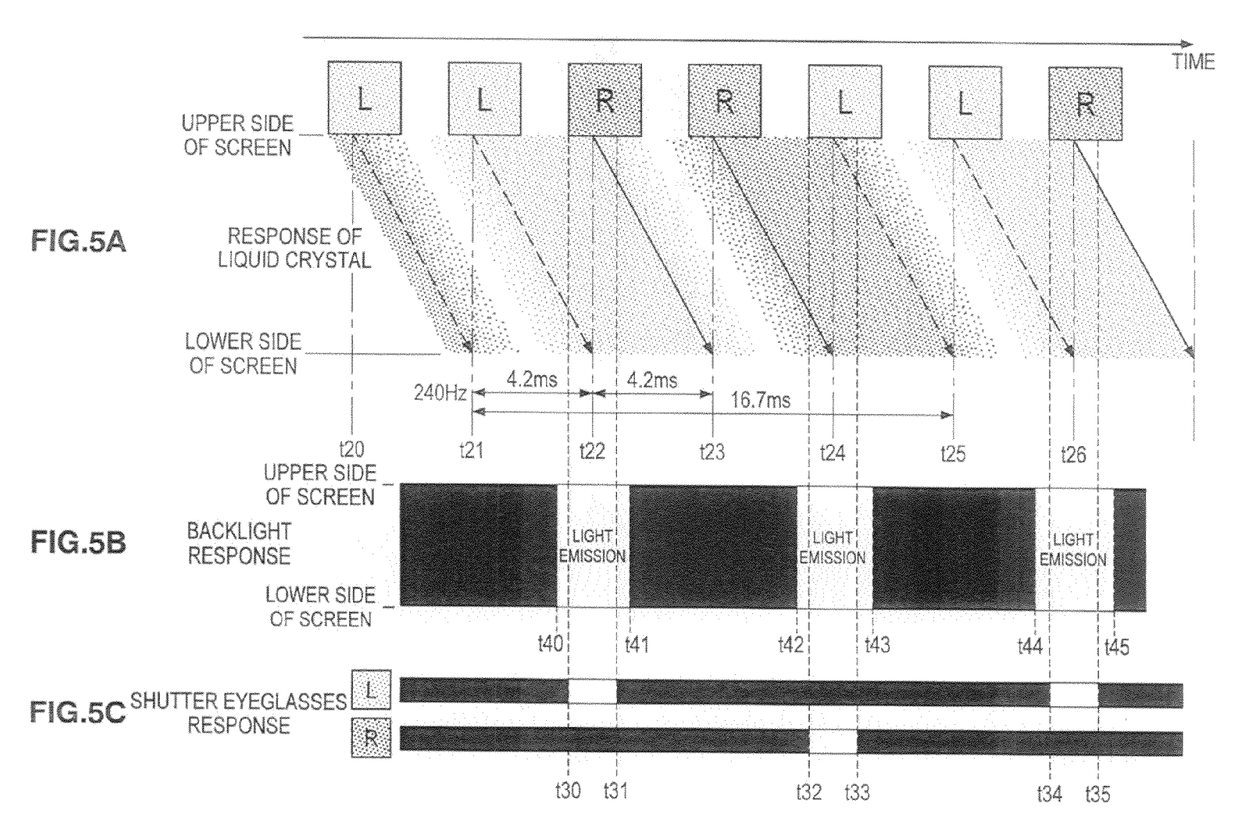
FIGS. 5A to 5C are timing charts showing a state in which the opening and closing of the liquid crystal shutters and the lighting of the backlight are synchronized.

FIGS. 5A to 5C are timing charts showing a state in which the opening and closing of the liquid crystal shutters 200a, 200b and the lighting of the backlight 136 are synchronized. In FIGS. 5A to 5C, FIGS. 5A and 5C are similar to FIG. 4A and FIG. 4C.

As shown in FIG. 5B, the backlight 136 is lighted in synchronization with the opening and closing of the liquid crystal shutters 200a, 200b in the present embodiment. The liquid crystal shutter 200b is opened during the time t30 to t31, and the backlight 136 is lighted during the time t40 to t41 in synchronization with the opening and closing of the liquid crystal shutter 200b. As shown in FIG. 5B, the interval between time t40 and t41 is set so that the interval between time t30 to t31 is included.

Similarly, the liquid crystal shutter 200a is opened during the time t32 to t33, and the backlight 136 is lighted during the time t42 to t43 in synchronization with the opening and closing of the liquid crystal shutters 200a, 200b. The liquid crystal shutter 200b is opened between time t34 and t35, and the backlight 136 is lighted between time t44 and t45 in synchronization with the opening and closing of the liquid crystal shutter 200b. As shown in FIG. 5B, the interval between time t42 and t43 is set to so that the interval between time t32 and t33 is included, and the interval between time t44 and t45 is set so that the interval between time t34 and t35 is included.

The backlight 136 is not lighted or emits light in dark color such as gray in the interval other than between time t40 and t41, between time t42 and t43, and between time t44 and t45. The backlight 136 is desirably lighted in dark color such as gray without being fully unlighted even in periods other than the lighting period of the backlight 136 since the response property of the liquid crystal depends on the temperature. Thereby, it is possible to prevent the temperature of the backlight 136 and the liquid crystal display panel 134 from lowering in periods other than the lighting period, and to reliably suppress the lowering of the response property of the liquid crystal.

As described above, the contrast can be further enhanced in the opened state and the closed state of the liquid crystal shutters 200a, 200b by lighting the backlight 136 in accordance with the timing at which the liquid crystal shutters 200a, 200b open, and lowering the luminance of the backlight 136 in other intervals.

In particular, when switching the light entering the eyes of the user with the liquid crystal shutters as with the displayed image viewing eyeglasses 200 according to the present embodiment, the transmissivity of light in the shutter opened state slightly lowers due to the transmissivity of the liquid crystal. The leak light is transmitted through the liquid crystal shutters even in the shutter closed state. Thus, the contrast of the opened state and the closed state of the liquid crystal shutter may not be sufficiently increased. In this case, the luminance of the video lowers in the shutter opened state, and the occurrence of crosstalk by the leak light in the shutter closed state becomes a matter of concern.

In the example of the present embodiment shown in FIGS. 5A to 5C, the luminance of the video which the user visually recognizes can be sufficiently increased in the opened state of the liquid crystal shutters 200a, 200b since the luminance of the backlight 136 increases when the liquid crystal shutters 200a, 200b open. The luminance of the backlight 136 lowers in the closed state of the liquid crystal shutters 200a, 200b. Therefore, it is possible to reliably prevent the light from being transmitted through the liquid crystal shutters 200a, 200b in a state where one of the liquid crystal shutter 200a or the liquid crystal shutter 200b is closed. Therefore, it is possible to present the video by the leak light from being visually recognized by the user and to reliably suppress the occurrence of crosstalk in a state where the liquid crystal shutters 200a, 200b are closed.

In the example of FIGS. 5A to 5C, the luminance of the backlight 136 is increased only in a predetermined interval in synchronization with the opening and closing of the liquid crystal shutters 200a, 200b, and hence it is possible to cause the luminance at the timing of lighting to be higher compared to that when the backlight 136 in lighted on a constant basis in the two-dimensional image display. In other words, since the luminance of the backlight 136 is increased only in a predetermined interval, it is possible to reserve the lifespan (durable years) equivalent to that when the backlight 136 is lighted on a constant basis, even if the luminance at the time of light emission is further increased. Therefore, according to the configuration of the present embodiment, it is possible to cause the luminance at the time of lighting to be higher than that when the backlight 136 is lighted on a constant basis, and the contrast of the liquid crystal display panel 134 in the opened state and the closed state of the liquid crystal shutters 200a, 200b can be further enhanced.

As described above, according to the present embodiment shown in FIGS. 5A to 5C, the lack of contrast of the liquid crystal shutters 200a, 200b is compensated by the contrast of the backlight 136. Therefore, the user can visually recognize the desired video with a high luminance achieved by the light emission of the backlight 136 in the shutter opened state, and thus video without crosstalk due to lowering of the luminance of the backlight 136, can be visually recognized in the shutter closed state. In the present embodiment, the writing of two times and the synchronization between the backlight 136 and the opening and closing of the shutter are simultaneously used, but the occurrence of the crosstalk can be suppressed and the desired luminance can be achieved even when only the synchronization between the backlight 136 and the opening and closing of the shutter is performed without performing the writing of two times.

[(6) Regarding Scan Lighting of Backlight]

Figure 6A:
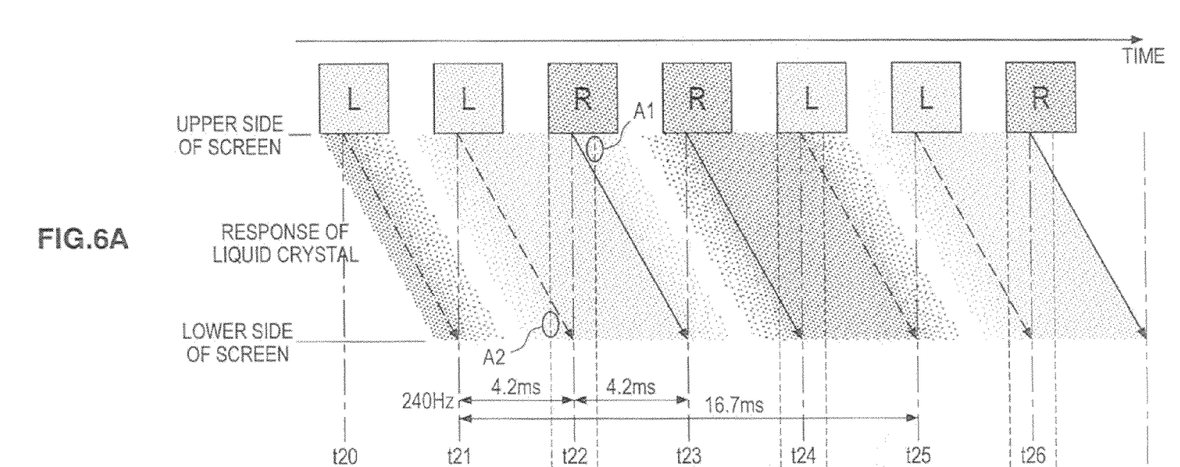
FIGS. 6A to 6C are timing charts showing a state in which the opening and closing of the liquid crystal shutters and the lighting of the backlight are synchronized, and show a case in which the backlight is scan lighted.
Figure 6B:
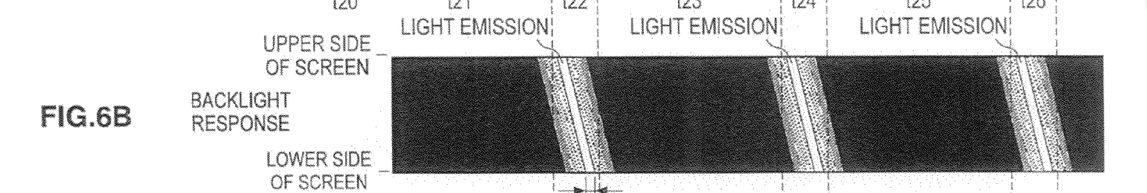
Figure 6C:
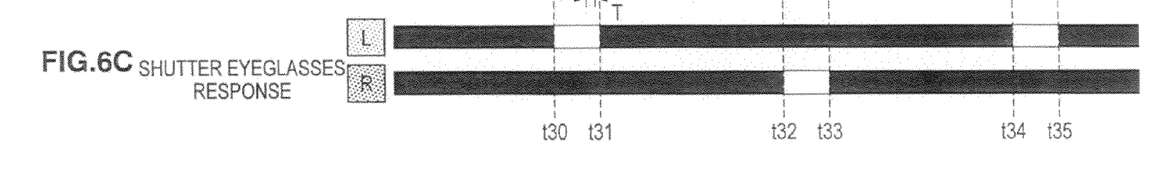

FIGS. 6A to 6C are timing charts showing a state in which the opening and closing of the liquid crystal shutters 200a, 200b and the lighting of the backlight 136 are synchronized, and show a case in which the backlight 136 is scan lighted. In FIGS. 6A to 6C, FIGS. 6A and 6C are similar to FIGS. 5A and 5C.

In FIGS. 5A to 5C, taking the interval t30 to 31 for example, during which the liquid crystal shutter 200b is opened, the entire surface of the backlight 136 is lighted in the interval between t30 and 31. In the example of FIGS. 6A to 6C, the backlight 136 is scan lighted from the upper side of the screen to the lower side of the screen in the interval between t30 and 31 during which the liquid crystal shutter 200b is opened. In other words, as shown in FIG. 6B, the backlight 136 is lighted for the interval T which is shorter than the interval from t30 to t31 during which the liquid crystal shutter 200b is opened, and the interval T during which the backlight 136 is lighted is moved from the upper side of the screen to the lower side of the screen in the interval from t30 to t31.

As described in FIGS. 3A and 3B, the occurrence of crosstalk can be suppressed since the liquid crystal shutters 200a, 200b are opened with the liquid crystal responding by writing each of the right eye image R and the left eye image L twice. In addition, in the example of FIGS. 6A to 6C, the backlight 136 is scan lighted while the shutters 200a, 200b are opened, and hence the occurrence of crosstalk can be more reliably suppressed.

More specifically describing, a region A1 at the upper side of the screen shown in FIG. 6A shows a state of transition when switching from the left eye image L to the right eye image R. Therefore, the right eye image R may slightly mix to the left eye image L around the timing at which the liquid crystal shutter 200b closes. However, the backlight 136 is not lighted at the upper side of the screen at the timing the liquid crystal shutter 200b closes, as shown in FIG. 6B. Thus, even if switched from the left eye image L to the right eye image R in the region A1 at the upper side of the screen, the right eye image R is not lighted by the backlight 136. Therefore, it is possible to reliably prevent the right eye image R from mixing to the left eye image L.

Only the video at the time of second writing to which the liquid crystal responds can be visually recognized by the user by scan lighting the backlight 136. Specifically describing, a region A2 at the lower side of the screen near the interval t30 to t31, which is shown in FIG. 6A, shows a state of transition when switching from the left eye image L by the first writing to the left eye image L by the second writing. Thus, there is a possibility that the left eye image L by the first writing is more visually recognized by the user at the timing at which the liquid crystal shutter 200b opens. However, the backlight 136 is not lighted at the lower side of the screen at the timing the liquid crystal shutter 200b opens, as shown in FIG. 6B. Thus, the left eye image L by the first writing is not lighted by the backlight 136 in the region A2 at the lower side of the screen. Furthermore, when the left eye image L by the second writing is displayed at the lower side of the screen, the left eye image L by the second writing is lighted by the scan lighted backlight 136. Therefore, the left eye image L by the second writing can be reliably visually recognized by the user at the lower side of the screen. The left eye image L by the first writing, to which the liquid crystal does not yet fully respond, can be reliably suppressed from being visually recognized by the user at the lower side of the screen.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
a signal control unit for receiving an input of an image signal, and converting to a signal for alternately displaying a right eye image and a left eye image;
a display panel, input with the signal converted by the signal control unit, for alternately displaying the right eye image and the left eye image;
a surface light source for radiating the display panel from a rear surface; and
a surface light source control unit for causing the surface light source to emit light according to switching of the right eye image and the left eye image,
wherein the signal control unit converts to a signal for displaying each of a right eye image signal and a left eye image signal at least two times continuously, and
wherein the surface light source emits light for one continuous period of half, or less than half, of the time corresponding to the at least two times.

2. The image display apparatus according to claim 1, comprising:
a shutter control unit for generating a timing signal indicating a switching timing of the right eye image and the left eye image in order to notify viewing eyeglasses including a right eye shutter and a left eye shutter of the switching timing of the right eye image and the left eye image, wherein
a period during which the shutter is open based on the timing signal is less than 50% of a period during which the right eye image and the left eye image are displayed.

3. The image display apparatus according to claim 2, wherein the surface light source control unit causes the surface light source to emit light in accordance with the period during which the shutter is open.

4. The image display apparatus according to claim 3, wherein the surface light source control unit causes the surface light source to scan light-emit from one end toward the other end of the display panel.

5. The image display apparatus according to claim 1, wherein when the surface light source control unit causes the surface light source to emit light according to the switching of the right eye image and the left eye image the surface light source control unit causes the surface light source to emit light with a higher luminance than in a case of the surface light source control unit not causing the surface light source to emit light according to the switching of the right eye image and the left eye image.

6. The image display apparatus according to claim 1, comprising:
a shutter control unit for generating a timing signal indicating a switching timing of the right eye image and the left eye image with respect to viewing eyeglasses including a right eye shutter and a left eye shutter, wherein
the surface light source control unit causes the surface light source to emit light for the same period as an open period of the shutter or for a period which is longer than the open period of the shutter according to the switching of the right eye image and the left eye image.

7. The image display apparatus according to claim 1, wherein the surface light source is constituted by an LED.

8. An image display observation system comprising:
an image display apparatus including a signal control unit for receiving an input of an image signal, and converting to a signal for alternately displaying a right eye image and a left eye image, a display panel, input with the signal converted by the signal control unit, for alternately displaying the right eye image and the left eye image, a surface light source for radiating the display panel from a rear surface, a surface light source control unit for causing the surface light source to emit light according to switching of the right eye image and the left eye image, and a shutter control unit for generating a timing signal indicating a switching timing of the right eye image and the left eye image; and
three-dimensional image observation eyeglasses, including a right eye shutter and a left eye shutter, for alternately opening the right eye and the left eye shutters based on the timing signal,
wherein the signal control unit converts to a signal for displaying each of a right eye image signal and a left eye image signal at least two times continuously, and
wherein the surface light source emits light for one continuous period of half, or less than half, of the time corresponding to the at least two times.

9. An image display method comprising the steps of:
receiving an input of an image signal, and converting to a signal for alternately displaying a right eye image and a left eye image;
alternately displaying the right eye image and the left eye image based on the converted signal; and
causing a surface light source of a display panel for displaying the right eye image and the left eye image to emit light according to switching of the right eye image and the left eye image,
wherein converting to a signal for alternately displaying a right eye image and a left eye image comprises converting to a signal for displaying each of a right eye image signal and a left eye image signal at least two times continuously, and
wherein the surface light source emits light for one continuous period of half, or less than half, of the time corresponding to the at least two times.

* * * * *